J. P. McTIMMONDS.
SACKER.
APPLICATION FILED SEPT. 15, 1908.
936,149.
Patented Oct. 5, 1909.
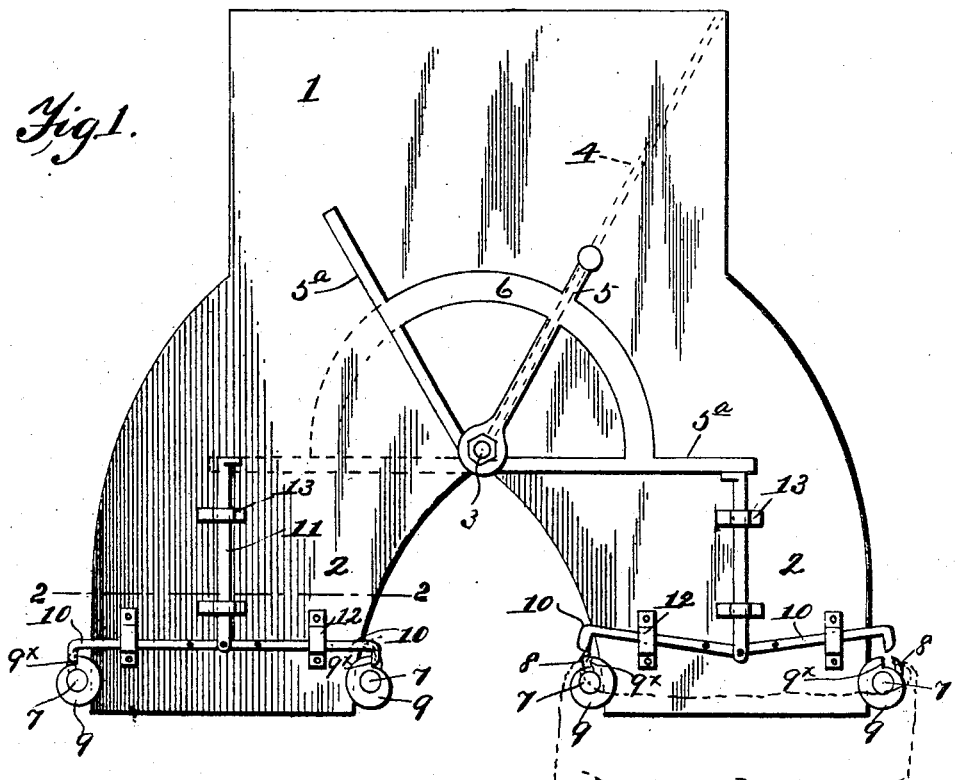
Fig. 1.
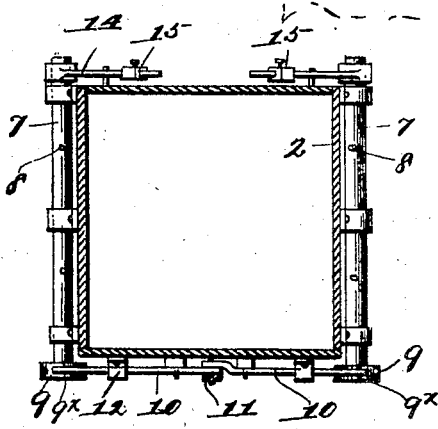
Fig. 2.
Fig. 3.
Witnesses
D. E. Wilson
E. B. McBath
Inventor
J. P. McTimmonds
By O'Meara & Bock
Attorneys

UNITED STATES PATENT OFFICE.

JAMES P. McTIMMONDS, OF FALLS CITY, OREGON.

SACKER.

936,149.

Specification of Letters Patent.

Patented Oct. 5, 1909.

Application filed September 15, 1908. Serial No. 453,091.

*To all whom it may concern:*

Be it known that I, JAMES P. McTIMMONDS, a citizen of the United States, residing at Falls City, in the county of Polk and the State of Oregon, have invented a new and useful Improvement in Sackers, of which the following is a specification.

This invention relates to a sacking device in which a hopper is provided with two discharge openings through which the flow of grain is controlled by a swinging grain board, and the object of the invention is to provide means for holding the sacks below said discharge opening, and releasing them when the grain board is shifted to a new position.

The invention consists in the novel features of construction hereinafter described, pointed out in the claims, shown in the accompanying drawings, in which:—

Figure 1 is a side elevation. Fig. 2 is a section on the line 2—2 of Fig. 1. Fig. 3 is a perspective view of a sack supporting roller.

In these drawings 1 represents a hopper having discharge chutes 2, and through which runs a shaft 3 to which is secured a grain board 4 which alternately cuts off the flow of grain through the two chutes 2. An operating handle 5 is mounted on said shaft, which is also provided with arms 5ª, the arms and handle being connected by a segment 6 which braces them.

Rollers 7 are mounted on opposite sides of the chutes adjacent their lower ends, there being four rollers in all, and adjacent one end each roller carries a cam 9 and the rollers are also provided with sack holding hooks 8. Locking levesr 10 are pivotally mounted on the chutes 2 in position to normally engage, by gravity, the cams 9. Vertically arranged plungers 11 are pivotally connected to the inner ends of the levers of each chute. The levers 10 work in brackets 12 and the plungers slide in brackets 13.

On the end portions of the rollers 7 opposite the cams 9 are fixed arms 14 having counterbalance weights 15, the weights being adjustable. The weights hold the hooks in an upwardly extending direction ready to receive a sack. As the grain enters the sack its weight will gradually overbalance the weights 15, but the rollers 7 from which the sack is suspended will be held against rotation by engagement of the levers 10 with the shouldered ends 9ˣ of the cams 9. While one sack is thus being filled another may be placed in position on the rollers of the other chute.

When the first sack is filled the handle 5 is operated thus shifting the grain board and turning the grain into the second mentioned sack. This shifting movement due to partial rotation of the shaft 3 is accompanied by corresponding movement on the part of the arms 5ª one of which strikes the plunger 11 pivoted to the levers 10 of the chute from which flow of grain has just been cut off, and the depression of this plunger lifts the outer ends of the levers from engagement with the cams, and releases the roller 7 which is partly rotated by weight of the grain in the sack, thus turning the hooks 8 downward, and releasing the sack.

What I claim is:

1. The combination with a grain chute, of rollers, hooks carried by the rollers, counterbalance weights connected to the rollers, shoulders carried by the rollers, hook levers engaging the shoulders, and a plunger pivotally connected to the inner ends of the levers.

2. A sacker comprising a discharge chute, a shaft, an arm carried by the shaft, rollers, sack holding hooks on the rollers, arms on the rollers, weights on the arms, cams having shoulders on the rollers, pivoted levers having hook portions engaging the cam shoulders, a plunger acting on said levers, said plunger being operated by the arm of the shaft.

3. A sacker comprising discharge chutes, rollers mounted to rotate adjacent the lower ends of the chutes, sack holding hooks carried by the rollers, cams provided with shoulders carried by the rollers, pivoted hook levers engaging said shoulders, plungers acting on the levers, a shaft, a swinging grain board carried by the shaft, arms carried by the shaft, said arms alternately engaging the plungers, means for partly rotating the shaft, and means for returning the rollers to normal position after partial rotation thereof by the weight of the grain delivered to the sacks, and after release of the sacks from the hooks.

JAMES P. McTIMMONDS.

Witnesses:
J. H. FLOWER,
J. T. CHAMBERLAIN.